United States Patent [19]

Schucker et al.

[11] 4,452,693

[45] Jun. 5, 1984

[54] PROCESS FOR INCREASING THE ACTIVITY OF PEROVSKITE CATALYSTS AND HYDROCARBON TREATING PROCESSES USING THE ACTIVATED CATALYST

[75] Inventors: Robert C. Schucker; Kenneth S. Wheelock, both of Baton Rouge, La.

[73] Assignee: Exxon Research and Engineering Co., Florham Park, N.J.

[21] Appl. No.: 507,298

[22] Filed: Jun. 24, 1983

Related U.S. Application Data

[62] Division of Ser. No. 351,969, Feb. 24, 1982, Pat. No. 4,418,008.

[51] Int. Cl.$^3$ ............................................. C10G 11/02
[52] U.S. Cl. ..................................... 208/121; 208/127
[58] Field of Search ...................... 208/121, 113, 127

[56] References Cited

U.S. PATENT DOCUMENTS

| | | | |
|---|---|---|---|
| 4,055,513 | 10/1977 | Wheelock | 252/462 |
| 4,102,777 | 7/1978 | Wheelock | 208/121 |
| 4,179,409 | 12/1979 | Gladrow et al. | 252/455 Z |
| 4,208,269 | 6/1980 | Gladrow et al. | 208/120 |
| 4,269,696 | 5/1981 | Metrailer | 208/120 |

*Primary Examiner*—Delbert E. Gantz
*Assistant Examiner*—Anthony McFarlane
*Attorney, Agent, or Firm*—Marthe L. Gibbons

[57] ABSTRACT

The activity of a fresh alkaline earth metal perovskite-containing catalyst can be increased by contacting the fresh catalyst with a reducing gas at reducing conditions prior to use. The activated catalyst is useful in hydrocarbon treating processes such as catalytic cracking and fluid coking.

11 Claims, 3 Drawing Figures

PROCESS FOR INCREASING THE ACTIVITY OF PEROVSKITE CATALYSTS AND HYDROCARBON TREATING PROCESSES USING THE ACTIVATED CATALYST

This is a division of application Ser. No. 351,969, filed Feb. 24, 1982, now U.S. Pat. No. 4,418,008.

BACKGROUND OF THE INVENTION

1. Field of the Invention

This invention relates to a process for increasing the activity of a fresh perovskite-containing catalyst and use of the activated catalyst in hydrocarbon treating processes.

2. Description of the Prior Art

U.S. Pat. Nos. 4,208,269 and 4,179,409 disclose perovskite catalysts and their use in hydrocarbon conversion processes.

U.S. Pat. Nos. 4,055,513 and 4,102,777 disclose high surface area perovskite catalysts and their use in hydrocarbon conversion processes.

U.S. Pat. No. 4,269,696 discloses an integrated fluid coking and gasification process in which a solid cracking catalyst is added to the coker chargestock.

U.S. Pat. No. 3,707,462 discloses fluid coking in which calcium oxide or a precursor thereof is present in the fluidized bed coking zone.

SUMMARY OF THE INVENTION

In accordance with the invention there is provided, a process for increasing the activity of a catalyst comprising a perovskite having at least one alkaline earth metal constituent selected from the group consisting of barium, beryllium, magnesium, calcium, strontium and mixtures thereof, which comprises the step of contacting said catalyst with a reducing gas at reducing conditions for a time sufficient to increase the activity of said catalyst.

DETAILED DESCRIPTION OF THE INVENTION

Figure 1:
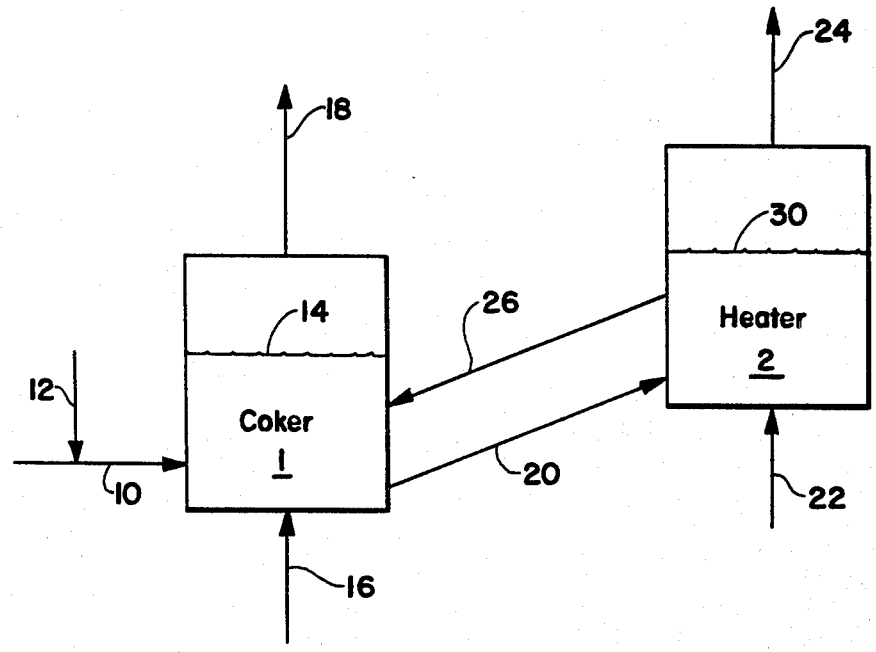
FIG. 1 is a schematic flow plan of one embodiment of the invention.

The activation process of the present invention is suitable for increasing the activity of fresh catalysts which comprise a perovskite comprising at least one alkaline earth metal constituent. The catalyst can consist of the perovskite alone unsupported or the catalyst may be a composite catalyst in which the perovskite is present together with other known catalytic components or supports. Furthermore, the perovskites can be used as support for other catalytic components.

The term "perovskite" is intended herein to designate metal oxides having the ideal and non-ideal perovskite crystalline structure. The ideal perovskite crystalline structure is defined by the empirical formula $ABO_3$ in which A and B are cations of different metals and in which the A cation is coordinated to 12 oxygen atoms while the B cation occupies octahedral sites and is coordinated to 6 oxygen atoms. The ideal perovskite structure is cubic; however, few compounds have this ideal structure. A more complete description of the perovskite type structure can be found in *Structural Inorganic Chemistry*, A. F. Wells, 3rd Edition, Oxford, Clarendon Press, 1962, pages 494-499. In general, the algebraic sum of the ionic charges of the two or more metals (cations) of the perovskite equals 6. The term "alkaline earth metals" includes beryllium, magnesium, calcium, strontium, barium and mixtures thereof. The perovskite may be a single perovskite or a mixture of perovskites. Preferably, the perovskites are alkaline earth metal zirconates and alkaline earth metal hafnates. More preferably, the perovskites are barium zirconate and barium hafnate. The perovskite may be unsupported or supported. The support may be chosen from a wide variety of conventional supports such as silica, silica-alumina, alumina, carbon, etc. Examples of certain high surface area supported perovskites are given in U.S. Pat. No. 4,055,513, the teachings of which are hereby incorporated by reference. The fresh perovskite catalyst is contacted with a reducing gas at reducing conditions for a time sufficient to increase the activity of the catalyst. The reducing agent used is not critical. Suitable reducing gases include hydrogen, carbon monoxide, and mixtures thereof. When hydrogen is used as the reducing gas, the hydrogen utilized may be pure hydrogen but will generally be a hydrogen stream containing some other gaseous contaminants, for example, the hydrogen-containing effluent produced in reforming processes, etc.

Suitable catalytic cracking conditions include a temperature ranging from about 750° to about 1300° F., and a pressure ranging from 0 to 150 psig, typically from about 0 to about 45 psig. The catalytic cracking process may be carried out as a fixed bed, moving bed, ebullated bed, slurry, transferline (dispersed phase) or fluidized bed operation. Suitable reducing conditions include a temperature of at least about 400° C., preferably a temperature ranging from about 400° to about 1000° C., more preferably a temperature ranging from about 600° to about 850° C. The pressure in the reducing zone is not critical and may range from atmospheric to superatmospheric pressure. The fresh catalyst is treated with the reducing gas for a time sufficient to increase its activity. Suitable contact time with the reducing gas include from about 1 second to about 1 hour, preferably from about 1 to about 20 minutes. The activated perovskite catalyst of the present invention is suitable for use in hydrocarbon treating processes such as catalytic cracking, catalytic fluid coking, reforming, hydrogenation, oxidation, dehydrogenation, isomerization, hydrocracking, hydrodesulfurization, denitrogenation, demetallization, etc. The activated perovskite catalyst is particularly suited for use in catalytic cracking and catalytic fluid coking, including integrated fluid coking and gasification processes, using high boiling point hydrocarbonaceous feeds having high content of metal contaminants and a high Conradson carbon residue. It should be noted that the catalyst when used in a specified hydrocarbon treating and conversion processes can be employed with any of the conventional hydrocarbon feeds used in the desired process, ranging from naphtha to residual oils.

DESCRIPTION OF THE PREFERRED EMBODIMENT

Referring to FIG. 1, a carbonaceous chargestock having a Conradson carbon content of at least 5 weight percent is passed by line 10 into a coking zone in coker 1 in which is maintained a fluidized bed of solids (e.g. coke particles of 40 to 1000 microns in size) having an upper level indicated at 14. Suitable carbonaceous chargestocks for the fluid coking stage include heavy hydrocarbonaceous oils; heavy and reduced petroleum crude; petroleum atmospheric distillation bottoms; petroleum vacuum distillation bottoms; pitch; asphalt; bitumen; other heavy hydrocarbon residues; tarsand oil; shale oil; liquid products derived from coal liquefaction processes, including coal liquefaction bottoms; coal; coal slurries, and mixtures thereof. Typically these feeds have a Conradson carbon residue of at least 5 weight percent, generally from about 5 to about 50 weight percent, preferably above about 7 weight percent (as to Conradson carbon residue, see ASTM Test D 189-65) and typically a high content of metal contaminants. A perovskite-containing catalyst, such as barium zirconate or strontium zirconate, which has been activated in accordance with the process of the present invention is added to the carbonaceous chargestock by line 12. Additionally or alternatively, the perovskite-containing catalyst can be added directly to the coking zone or indirectly by a recycle solids stream. The activated perovskite-containing catalyst is added to the chargestock desirably in an amount ranging from about 0.1 to about 10 weight percent, preferably from about 1 to about 10 weight percent, based on the initial coker chargestock. The catalyst particles are suitably below about 44 microns in diameter, preferably below about 20 microns in diameter, preferably below about 5, more preferably below about 5 microns in diameter.

A fluidizing gas is admitted to coker 1 by line 16 in an amount sufficient to maintain a superficial gas velocity in the range of about 0.3 to about 5 feet per second. The fluidizing gas may comprise steam, gaseous hydrocarbons, vaporized normally liquid hydrocarbons, hydrogen, hydrogen sulfide and mixtures thereof. Typically, the fluidizing gas used will comprise steam. Coke at a temperature above the coking temperature, for example, at a temperature of 100 to 800 Fahrenheit degrees in excess of the actual operating temperature of the coking zone is admitted to coker 1 by line 26 in an amount sufficient to maintain the coking temperature in the range of about 850° to about 1400° F., preferably in the range of about 900° to about 1200° F. The total pressure in the coking zone is maintained in the range of about 0 to about 150 pounds per square inch gauge (psig), preferably in the range of about 5 to about 100 psig. The lower portion of the coker serves as a stripping zone to remove occluded hydrocarbons from the solids. The vaporous products include gaseous hydrocarbons and normally liquid hydrocarbon as well as other gases which were introduced into the coker as fluidizing gas. The vapor phase product is removed from coker 1 by line 18 for scrubbing and fractionation in a conventional way. If desired, at least a portion of the vaporous effluent may be recycled to the coker as fluidizing gas. A stream of heavy materials condensed from the vaporous coker effluent may be recycled to the coker or the coker may be operated in a once-through manner, that is, without recycle of the heavy material to the coker.

A stream of stripped coke (commonly called cold coke) is withdrawn from the coker by line 20 and introduced into a fluid bed of hot coke having a level 30 in heater 2. The heater may be operated as a conventional coke burner such as disclosed in U.S. Pat. No. 2,881,130, which is hereby incorporated by reference. When the heater is operated as a burner, an oxygen-containing gas, typically air, is introduced into heater 2 by line 22. The combustion of a portion of the solid carbonaceous deposition on the solids with the oxygen-containing gas provides the heat required to heat the colder particles. The temperature in the heating zone (burning zone) is maintained in the range of about 1200° to about 1700° F. Alternatively, heater 2 can be operated as a heat exchange zone such as disclosed in U.S. Pat. Nos. 3,661,543; 3,702,516 and 3,759,676, the teachings of which are hereby incorporated by reference. Hot coke is removed from the fluidized bed in heater 2 and circulated to the coker by line 26 to supply heat thereto. If desired, the perovskite-containing catalyst may be recovered from the heating zone or from the gasification zone of an integrated coking and gasification process and the recovered perovskite catalyst may be recycled to the coker chargestock or to the dilute phase of the coker, as described in U.S. Pat. No. 4,269,696, the teachings of which are hereby incorporated by reference.

The following examples are presented to illustrate the invention.

EXAMPLE 1

Figure 2:
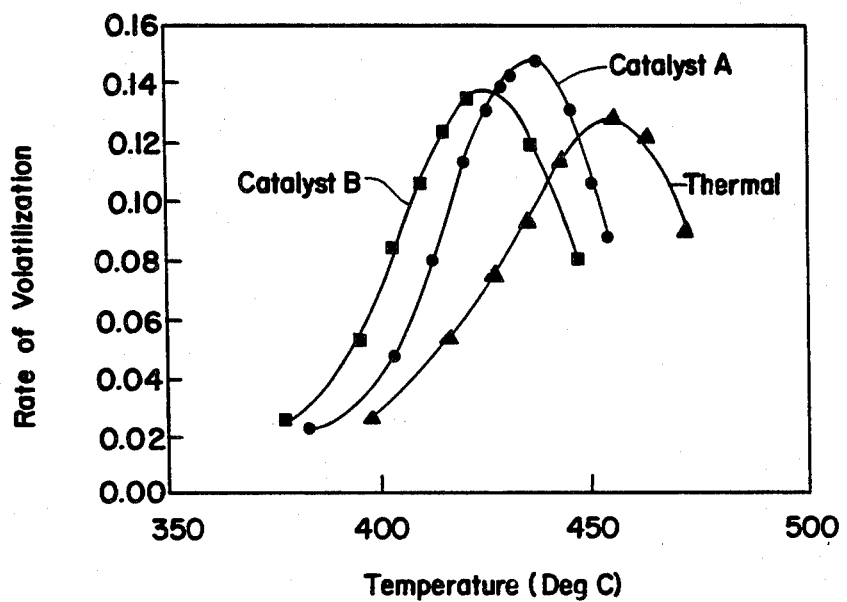
FIG. 2 is a graph showing rate of volatilization of a vacuum residuum versus temperature for a barium zirconate catalyst.

An Arabian heavy vacuum residuum having an atmospheric pressure initial boiling point above 1050° F. was analyzed by thermogravimetric analysis and the rate of volatilization measured. This rate is shown as a function of temperature in FIG. 2 by the term labeled "thermal". A second run was made using an equivalent weight of residuum and a fresh barium zirconate catalyst, herein designated catalyst A, and the results of this run are shown in FIG. 2. The fresh barium zirconate powder was then reduced at 650° C. in hydrogen for 5 minutes and the results of the third test using the reduced catalyst, herein designated catalyst B. The fresh reduced catalyst, that is, catalyst B, is a catalyst in accordance with the present invention. As can be seen from the data in the graph, the hydrogen treatment of the fresh catalyst increased the catalytic activity of the fresh catalyst.

EXAMPLE 2

Figure 3:
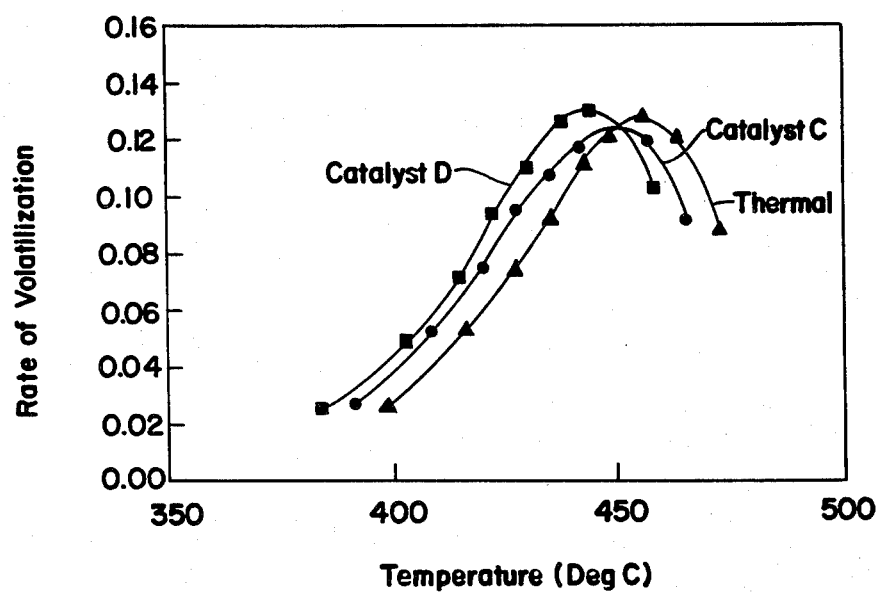
FIG. 3 is a graph showing rate of volatilization of a vacuum residuum versus temperature for a strontium zirconate catalyst.

Another series of tests was made using the same feed as in Example 1 but using a fresh strontium zirconate catalyst, herein designated catalyst C. A similar run was made with a fresh strontium zirconate catalyst that was first treated with hydrogen at 750° C. for 10 minutes, herein designated catalyst D, which is a catalyst in accordance with the present invention. As can be seen from FIG. 3, catalyst D showed increased catalytic activity over fresh catalyst C that had not been reduced with hydrogen prior to use.

What is claimed is:

1. A hydrocarbon cracking process which comprises contacting a hydrocarbonaceous feed at hydrocarbon cracking conditions with a catalyst that has been activated by a process which comprises contacting a catalyst comprising a perovskite having at least one alkaline earth metal constituent selected from the group consisting of barium, beryllium, magnesium, calcium, strontium and mixtures thereof, with a reducing gas at reducing conditions for a time sufficient to increase the activity of said catalyst.

2. The hydrocarbon cracking process of claim 1, wherein said alkaline earth metal constituent is selected from the group consisting of barium, strontium and mixtures thereof.

3. The hydrocarbon cracking process of claim 1, wherein said perovskite is selected from the group consisting of barium zirconate, barium hafnate, strontium zirconate, strontium hafnate and mixtures thereof.

4. The hydrocarbon cracking process of claim 1, wherein said catalyst comprises a supported perovskite.

5. The hydrocarbon cracking process of claim 1, wherein said catalyst consists essentially of said perovskite without a support.

6. The hydrocarbon cracking process of claim 1, wherein said reducing gas is selected from the group consisting of hydrogen, carbon monoxide and mixtures thereof.

7. The hydrocarbon cracking process of claim 1, wherein said reducing conditions include a temperature ranging from about 400° C. to about 1000° C.

8. The hydrocarbon cracking process of claim 1, wherein said catalyst is contacted with said reducing gas for a period ranging from about 1 second to about 1 hour.

9. The process of claim 1 wherein said hydrocarbon cracking process is catalytic cracking.

10. The process of claim 1 wherein said hydrocarbon cracking process is a fluid coking process.

11. The process of claim 1 wherein said hydrocarbonaceous feed comprises metallic contaminants.

* * * * *